United States Patent
Chen et al.

(10) Patent No.: US 12,451,715 B2
(45) Date of Patent: Oct. 21, 2025

(54) BATTERY, ELECTRIC APPARATUS, AND CHARGING METHOD AND APPARATUS FOR BATTERY

(71) Applicant: CONTEMPORARY AMPEREX TECHNOLOGY (HONG kONG) LIMITED, Hong Kong (CN)

(72) Inventors: Chen Chen, Ningde (CN); Lei Huang, Ningde (CN); Guangyu Xu, Ningde (CN); Wei Zhao, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 738 days.

(21) Appl. No.: 17/839,607

(22) Filed: Jun. 14, 2022

(65) Prior Publication Data

US 2022/0320888 A1    Oct. 6, 2022

Related U.S. Application Data

(63) Continuation of application No. PCT/CN2021/082193, filed on Mar. 22, 2021.

(51) Int. Cl.
*H02J 7/00* (2006.01)
*G01R 31/367* (2019.01)
(Continued)

(52) U.S. Cl.
CPC ...... *H02J 7/007182* (2020.01); *G01R 31/367* (2019.01); *G01R 31/3835* (2019.01);
(Continued)

(58) Field of Classification Search
CPC ... G01R 31/3835; G01R 31/392; H02J 7/005; H02J 7/0031; H02J 7/007188; H02J 7/0047; B60L 58/16; Y02E 60/10
(Continued)

(56) References Cited

U.S. PATENT DOCUMENTS

| 6,456,948 B1 | 9/2002 | Lim |
| 2005/0154544 A1* | 7/2005 | Ono ............... G01R 31/3828 |
| | | 702/63 |

(Continued)

FOREIGN PATENT DOCUMENTS

| CN | 101609359 A | 12/2009 |
| CN | 102306943 A | 1/2012 |

(Continued)

OTHER PUBLICATIONS

International Search Report of Application No. PCT/CN2021/082193, mailed Oct. 26, 2021.

(Continued)

*Primary Examiner* — Julian D Huffman
*Assistant Examiner* — Lisa Kotowski
(74) *Attorney, Agent, or Firm* — Ladas & Parry LLP

(57) ABSTRACT

Embodiments of this application provide a battery, an electric apparatus, a battery charging method, and an apparatus for charging a battery. The technical solutions provided by the application belong to the field of battery charging technologies. In this application, a historical capacity decline of the battery is determined based on capacity decline in a k-th discharging process and a capacity decline in previous k−1 discharging processes, a full charge voltage in an m-th charging process is determined based on the historical capacity decline, and then m-th charging is performed, based on the determined full charge voltage in the m-th charging process, on the battery. Because the historical capacity decline increases constantly with the use of the battery, in this application, the full charge voltage of the battery in the charging process is increased constantly, or the full charge voltage is opened up constantly.

12 Claims, 4 Drawing Sheets

(51) Int. Cl.
  *G01R 31/3835* (2019.01)
  *B60L 58/16* (2019.01)
(52) U.S. Cl.
  CPC ............ *H02J 7/0049* (2020.01); *H02J 7/005* (2020.01); *B60L 58/16* (2019.02); *H02J 7/0031* (2013.01)
(58) Field of Classification Search
  USPC .......................................................... 320/134
  See application file for complete search history.

(56) References Cited

U.S. PATENT DOCUMENTS

| | | | | |
|---|---|---|---|---|
| 2008/0150489 | A1* | 6/2008 | Shun-Hsing | H01M 10/44 320/136 |
| 2012/0120983 | A1* | 5/2012 | Henkel | G01R 19/16542 324/427 |
| 2014/0214349 | A1* | 7/2014 | Dong | G01R 31/392 702/63 |
| 2017/0199249 | A1* | 7/2017 | Novak | G01R 31/367 |
| 2017/0274784 | A1* | 9/2017 | Nagakura | H02J 7/00302 |
| 2021/0148986 | A1 | 5/2021 | Dong et al. | |

FOREIGN PATENT DOCUMENTS

| | | |
|---|---|---|
| CN | 103969585 A | 8/2014 |
| CN | 105425156 A | 3/2016 |
| CN | 111106400 A | 10/2021 |
| EP | 1555537 A1 | 7/2005 |
| EP | 3783377 A1 | 2/2021 |
| JP | H11223665 A | 8/1999 |
| JP | 2016096696 A | 5/2016 |
| WO | 2015019427 A1 | 2/2015 |

OTHER PUBLICATIONS

Written Opinion of Application No. PCT/CN2021/082193, mailed Oct. 26, 2021.
Extended European Search Report for EP application No. 21908116.3, mailed Mar. 24, 2023.
First Office Action of CN application No. 202180071368.5, dated Aug. 22, 2025.

* cited by examiner

BATTERY, ELECTRIC APPARATUS, AND CHARGING METHOD AND APPARATUS FOR BATTERY

CROSS REFERENCE TO RELATED APPLICATION

This application is a continuation of International Patent Application No. PCT/CN2021/082193, filed on Mar. 22, 2021. The disclosure of the application is hereby incorporated by reference in its entirety.

TECHNICAL FIELD

Embodiments of this application relate to the field of battery charging technologies, and in particular, to a battery, an electric apparatus, and a charging method and apparatus for battery.

BACKGROUND

Due to higher energy density, lithium-ion batteries are widely used in consumer electronic products. With the development of electric vehicles, lithium-ion batteries as a power source have become a development tendency of lithium-ion batteries at present. A battery management system (BMS) for a lithium-ion battery pack serves as an application system for controlling and managing charge-discharge cycling of the lithium-ion battery pack, and controls the lithium-ion battery pack to be charged or discharged in a particular mode.

At present, a BMS controls charging and discharging of a lithium-ion battery pack in the following two modes. A first mode is mild charging and discharging. In the process of regular discharging, when detecting that a current battery level drops to a preset lower limit, a processor disconnects an output circuit, so that the lithium-ion battery pack stops discharging. In the process of regular charging, when a current battery level of a lithium-ion battery being charged rises to a preset upper limit of capacity (the preset upper limit of capacity is any value from 80% to 90% of a nominal capacity of the lithium-ion battery pack), the processor disconnects a charge circuit, so that charging is automatically stopped. A second mode is deep discharging. This is to reduce fading of the battery capacity.

However, the related technologies can only delay decline of the battery capacity, but not guarantee that the battery capacity does not decline at all.

SUMMARY

In view of the foregoing problem, embodiments of this application provide a battery, an electric apparatus, and a charging method and apparatus for battery, to guarantee that dischargeable capacity of a battery fully charged does not decline along with aging of the battery.

According to a first aspect of the embodiments of this application, a charging method for battery is provided. The method includes:

obtaining a capacity decline of a battery in a k-th discharging process, where a start time of the k-th discharging process is an end time of an (n−1)-th charging state of the battery, and an end time of the k-th discharging process is a start time of an m-th charging state of the battery, where k is an integer greater than or equal to 1, and m is an integer greater than or equal to 1;

obtaining, based on the capacity decline in the k-th discharging process and a capacity decline in previous k−1 discharging processes, a historical capacity decline of the battery;

determining, based on a nominal capacity of the battery and the historical capacity decline, a full charge voltage of the battery in the m-th charging process; and implementing, based on the full charge voltage in the m-th charging process, the m-th charging process on the battery.

In the embodiments of this application, the historical capacity decline is determined first, the full charge voltage is then determined based on the historical capacity decline, and after that, the battery is charged based on the determined full charge voltage. The historical capacity decline increases constantly along with use of the battery. Therefore, in this application, the full charge voltage of the battery in the charging process also increases constantly, or the full charge voltage is opened constantly in this way, the decline of the battery capacity can be compensated for at each time of charging, so that the battery truly reaches full charge, thereby guaranteeing that the capacity of the battery does not decline at discharging.

Optionally, the obtaining a capacity decline of a battery in a k-th discharging process includes:

obtaining discharging parameters of the battery in the k-th discharging process, where the discharging parameters include average current, average temperature, battery capacity interval, and cumulative throughput, where an upper limit of the battery capacity interval is a battery capacity of the battery at the end of the (m−1)-th charging process, and a lower limit of the battery capacity interval is a battery capacity of the battery at the beginning of the m-th charging process; and obtaining, based on the average current, average temperature, battery capacity interval, and cumulative throughput of the battery in the k-th discharging process, the capacity decline of the battery in the k-th discharging process.

In the embodiments of this application, the discharging parameters in the k-th discharging process are obtained, and the capacity decline of the battery in the k-th discharging process can be precisely determined based on the discharging parameters in the k-th discharging process. With the method of this application, the capacity decline of the battery in each discharging process can be precisely determined.

Optionally, the obtaining, based on the average current, average temperature, battery capacity interval, and cumulative throughput of the battery in the k-th discharging process, the capacity decline of the battery in the k-th discharging process includes:

determining, based on the average current, average temperature, battery capacity interval, and cumulative throughput of the battery in the k-th discharging process, the capacity decline in the k-th discharging process according to the following equation:

$$\Delta SOH_k = C_a \cdot e^{-\frac{Eb}{R}\left(\frac{1}{T}-\frac{1}{T_0}\right)} \cdot f(SOC_{upk}) \cdot f(SOC_{lowk}) \cdot f(C_k) \cdot \Delta C_k^z$$

where $\Delta SOH_k$ is the capacity decline in the k-th discharging process, $C_a$, $Eb$ and $z$ are predetermined constants of the battery, R is 8.314, T is the average temperature, $T_0$ is 298.15 degrees kelvin, $SOC_{upk}$ is the upper limit of the battery capacity interval in the k-th discharging process, $SOC_{lowk}$ is the lower limit of the battery capacity interval in the k-th discharging process, $C_k$ is the average current in the k-th discharging process, and $\Delta C_k$ is the cumulative throughput in the k-th discharging process. Here, SOH refers to a state of health of the battery, whose full name is state of health, and SOC refers to a remaining capacity of the battery, whose full name is state of charge.

In the embodiments of this application, the capacity decline of the battery in the k-th discharging process can be precisely determined based on the average current, average temperature, battery capacity interval, and cumulative throughput in the k-th discharging process. With the method of this application, the capacity decline of the battery in each discharging process can be precisely determined.

Optionally, the determining, based on a nominal capacity of the battery and the historical capacity decline, a full charge voltage of the battery in the m-th charging process includes:

obtaining, based on the nominal capacity and the historical capacity decline, a capacity that the battery needs to reach in the m-th charging process; and obtaining, based on the capacity that the battery needs to reach in the m-th charging process, the full charge voltage of the battery in the m-th charging process.

In the embodiments of this application, the full charge voltage of the battery in the m-th charging process is determined based on the historical capacity decline. The historical capacity decline increases constantly along with use of the battery. Therefore, in this application, the full charge voltage of the battery in the charging process also increases constantly without being fixed. This improves accuracy of the determined full charge voltage.

Optionally, the determining, based on a nominal capacity of the battery and the historical capacity decline, a full charge voltage of the battery in the m-th charging process includes:

under the condition that the historical capacity decline is greater than or equal to an m-th preset threshold, determining, based on the nominal capacity of the battery and the historical capacity decline, the full charge voltage of the battery in the n-th charging process.

In the embodiments of this application, the full charge voltage of the battery in the m-th charging process is determined only when the historical capacity decline has reached the m-th preset threshold. In this way, resource consumption for frequently determining a full charge voltage of the battery in charging processes can be avoided.

Optionally, the implementing, based on the full charge voltage in the m-th charging process, the m-th charging process on the battery includes:

monitoring an actual voltage of the battery in the process of charging the battery;

determining whether the actual voltage has risen to the full charge voltage of the battery in the m-th charging process; and stopping charging the battery when it is determined that the actual voltage has risen to the full charge voltage of the battery in the m-th charging process.

In the embodiments of this application, when the actual voltage of the battery rises to the full charge voltage in the m-th charging process, the battery stops being charged, and otherwise, the battery continues being charged. In this way, it can be guaranteed that the battery is fully charged to the full charge voltage in the m-th charging process, thereby guaranteeing that the capacity does not decline in subsequent discharging.

According to a second aspect of the embodiments of this application, a charging apparatus for battery is provided. The apparatus includes:

a processing module, configured to obtain a capacity decline of a battery in a k-th discharging process, where a start time of the k-th discharging process is an end time of an (m−1)-th charging state of the battery, and an end time of the k-th discharging process is a start time of an m-th charging state of the battery, where k is an integer greater than or equal to 1, and m is an integer greater than or equal to 1; where the processing module is further configured to obtain, based on the capacity decline in the k-th discharging process and a capacity decline in previous k−1 discharging processes, a historical capacity decline of the battery; and the processing module is further configured to determine, based on a nominal capacity of the battery and the historical capacity decline, a full charge voltage of the battery in the m-th charging process; and a charging module, configured to implement, based on the full charge voltage in the m-th charging process, the m-th charging process on the battery.

Optionally, the processing module is configured to:

obtain discharging parameters of the battery in the k-th discharging process, where the discharging parameters include average current, average temperature, battery capacity interval, and cumulative throughput, where an upper limit of the battery capacity interval is a battery capacity of the battery at the end of the (m−1)-th charging process, and a lower limit of the battery capacity interval is a battery capacity of the battery at the beginning of the m-th charging process; and obtain, based on the average current, average temperature, battery capacity interval, and cumulative throughput of the battery in the k-th discharging process, the capacity decline of the battery in the k-th discharging process.

Optionally, the processing module is configured to:

determine, based on the average current, average temperature, battery capacity interval, and cumulative throughput of the battery in the k-th discharging process, the capacity decline in the k-th discharging process according to the following equation:

$$\Delta SOH_k = C_a \cdot e^{-\frac{Eb}{R}\left(\frac{1}{T}-\frac{1}{T_0}\right)} \cdot f(SOC_{upk}) \cdot f(SOC_{lowk}) \cdot f(C_k) \cdot \Delta C_k^z$$

where $\Delta SOH_k$ is the capacity decline in the k-th discharging process, $C_a$, Eb and z are predetermined constants of the battery, R is 8.314 T is the average temperature, $T_0$ is 298.15 degrees kelvin, $SOC_{upk}$ is the upper limit of the battery capacity interval in the k-th discharging process, $SOC_{lowk}$ is the lower limit of the battery capacity interval in the k-th discharging process, CL is the average current in the k-th discharging process, and $\Delta C_k$ is the cumulative throughput in the k-th discharging process.

Optionally, the processing module is configured to:

obtain, based on the nominal capacity and the historical capacity decline, a capacity that the battery needs to reach in the m-th charging process; and obtain, based on the capacity that the battery needs to reach in the m-th charging process, the full charge voltage of the battery in the m-th charging process.

Optionally, the processing module is configured to:

under the condition that the historical capacity decline is greater than or equal to an m-th preset threshold, determine, based on the nominal capacity of the battery and the historical capacity decline, the full charge voltage of the battery in the m-th charging process.

Optionally, the charging module is configured to:

monitor an actual voltage of the battery in the process of charging the battery;

determine whether the actual voltage has risen to the full charge voltage of the battery in the m-th charging process; and stop charging the battery when it is determined that the actual voltage has risen to the full charge voltage of the battery in the m-th charging process.

According to a third aspect of the embodiments of this application, a battery is provided. The battery includes the charging apparatus according to the second aspect.

According to a fourth aspect of the embodiments of this application, an electric apparatus is provided. The electric apparatus includes a battery. The battery is configured to provide electric energy. The electric apparatus charges the battery using the method according to the first aspect.

According to a fifth aspect of the embodiments of this application, a charging apparatus for battery is provided, including a processor, a memory, and a bus, where the processor and the memory communicate with each other through the bus; and the memory is configured to store at least one executable instruction that causes the processor to execute the steps of the charging method for battery according to the first aspect.

In the embodiments of this application, the historical capacity decline of the battery is determined based on the capacity decline in the k-th discharging process and the capacity decline in the previous k−1 discharging processes, the full charge voltage in the m-th charging process is determined based on the historical capacity decline, and then the m-th charging process is implemented on the battery based on the determined full charge voltage in the m-th charging process. The historical capacity decline increases constantly along with use of the battery. Therefore, in this application, the full charge voltage of the battery in the charging process also increases constantly, or the full charge voltage is opened constantly. In this way, the decline of the battery capacity can be compensated for at each time of charging, so that the battery truly reaches full charge, thereby guaranteeing that the capacity of the battery does not decline at discharging.

BRIEF DESCRIPTION OF DRAWINGS

To describe the technical solutions in the embodiments of this application more clearly, the following briefly describes the accompanying drawings required for describing the embodiments. Apparently, the accompanying drawings in the following description show some of embodiments of this application, and a person of ordinary skill in the art may still derive other drawings from these accompanying drawings without creative efforts.

DESCRIPTION OF EMBODIMENTS

To make the objectives, technical solutions, and advantages of the embodiments of this application clearer, the following clearly describes the technical solutions in the embodiments of this application with reference to the accompanying drawings in the embodiments of this application. Apparently, the embodiments described are some but not all of the embodiments of this application. All other embodiments obtained by a person of ordinary skill in the art based on the embodiments of this application without creative efforts shall fall within the protection scope of this application.

Unless otherwise defined, all technical and scientific terms used herein shall have the same meanings as commonly understood by those skilled in the art to which this application belongs. The terms used in the specification of this application are merely intended to describe the specific embodiments but not intended to constitute any limitation on this application.

The term "embodiment" described herein means that specific features, structures or characteristics described with reference to the embodiment may be incorporated in at least one embodiment of this application. The word "embodiment" in various positions in the specification does not necessarily refer to the same embodiment, or refer to independent or alternative embodiments that are mutually exclusive with other embodiments. A person skilled in the art can explicitly or implicitly understand that the embodiments described herein may combine with other embodiments.

Figure 1:
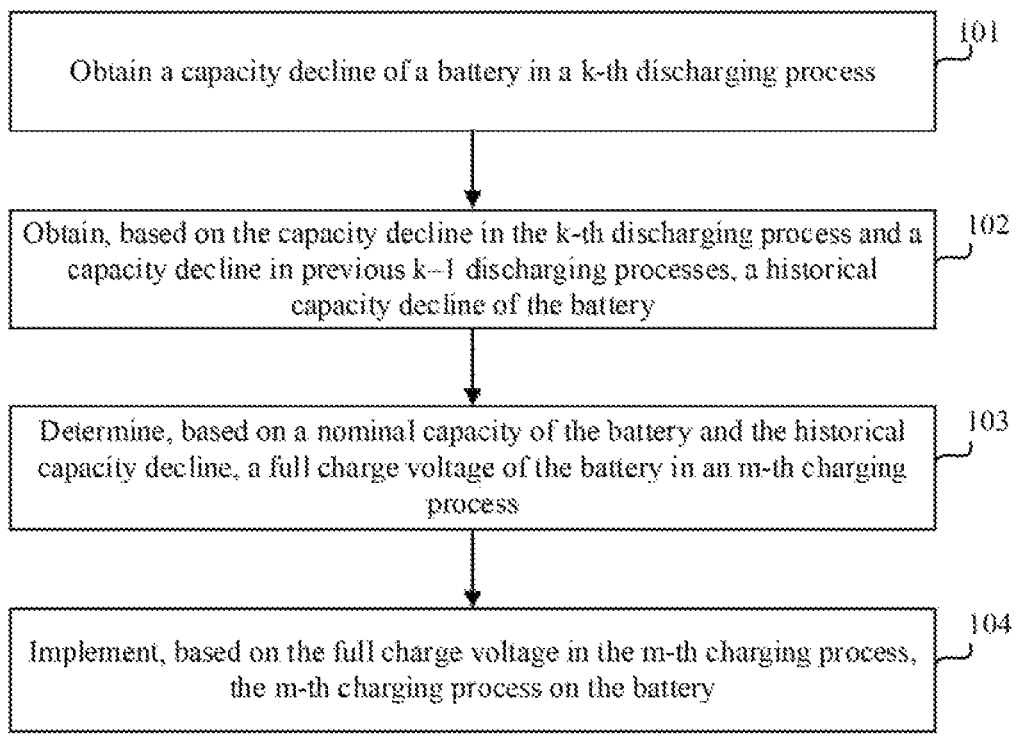
FIG. 1 is a flowchart of a charging method for battery according to an embodiment of this application.

FIG. 1 is a flowchart of a charging method for battery according to an embodiment of this application. The method may be applied to a charging apparatus for battery. The apparatus includes a body and a battery disposed in the body. The battery is configured to provide electric energy. The apparatus may be a vehicle, for example, a new energy vehicle. The new energy vehicle may be a battery electric vehicle, a hybrid electric vehicle, an extended-range electric vehicle, or the like. A vehicle body is provided with a drive motor. The drive motor is electrically connected to the battery, and is provided with electrical energy by the battery. The drive motor is connected to wheels on the vehicle body through a transmission mechanism to drive the vehicle. Alternatively, the apparatus may be an unmanned aerial vehicle, a ship, or the like.

In terms of category, the battery in the embodiments of this application may be a lithium-ion battery, a lithium metal battery, a lead-acid battery, a nickel-cadmium battery, a nickel-metal hydride battery, a lithium-sulfur battery, a lithium-air battery, a sodium-ion battery, or the like. This is not specifically limited in the embodiments of this application. In terms of scale, the battery may be a battery cell, a battery module, or a battery pack. This is not specifically limited in the embodiments of this application. In addition, the battery in the embodiments of this application includes a battery management system (battery management system, BMS). Specifically, the method may be applied to the BMS.

Certainly, in the embodiments of this application, the BMS may alternatively be a separate apparatus or device. The BMS may control the battery and charge the battery using the charging method for battery according to the embodiments of this application. As shown in FIG. 1, the method includes the following steps.

Step 101: Obtain a capacity decline of a battery in a k-th discharging process.

A start time of the k-th discharging process is an end time of an (m−1)-th charging state of the battery, and an end time of the k-th discharging process is a start time of an m-th charging state of the battery, where k is an integer greater than or equal to 1, and m is an integer greater than or equal to 1.

Step 102: Obtain, based on the capacity decline in the k-th discharging process and a capacity decline in previous k−−1 discharging processes, a historical capacity decline of the battery.

Step 103: Determine, based on a nominal capacity of the battery and the historical capacity decline, a full charge voltage of the battery in an m-th charging process.

Step 104: Implement, based on the full charge voltage in the m-th charging process, the m-th charging process on the battery.

In the embodiments of this application, the historical capacity decline of the battery is determined based on the capacity decline in the k-th discharging process and the capacity decline in the previous k−1 discharging processes, the full charge voltage in the m-th charging process is determined based on the historical capacity decline, and then the m-th charging process is implemented on the battery based on the determined full charge voltage in the m-th charging process. The historical capacity decline increases constantly along with use of the battery. Therefore, in this application, the full charge voltage of the battery in the charging process also increases constantly, or the full charge voltage is opened constantly in this application. In this way, the decline of the battery capacity can be compensated for each time of charging, so that the battery truly reaches full charge, thereby guaranteeing that the capacity of the battery does not decline at discharging.

Figure 2:
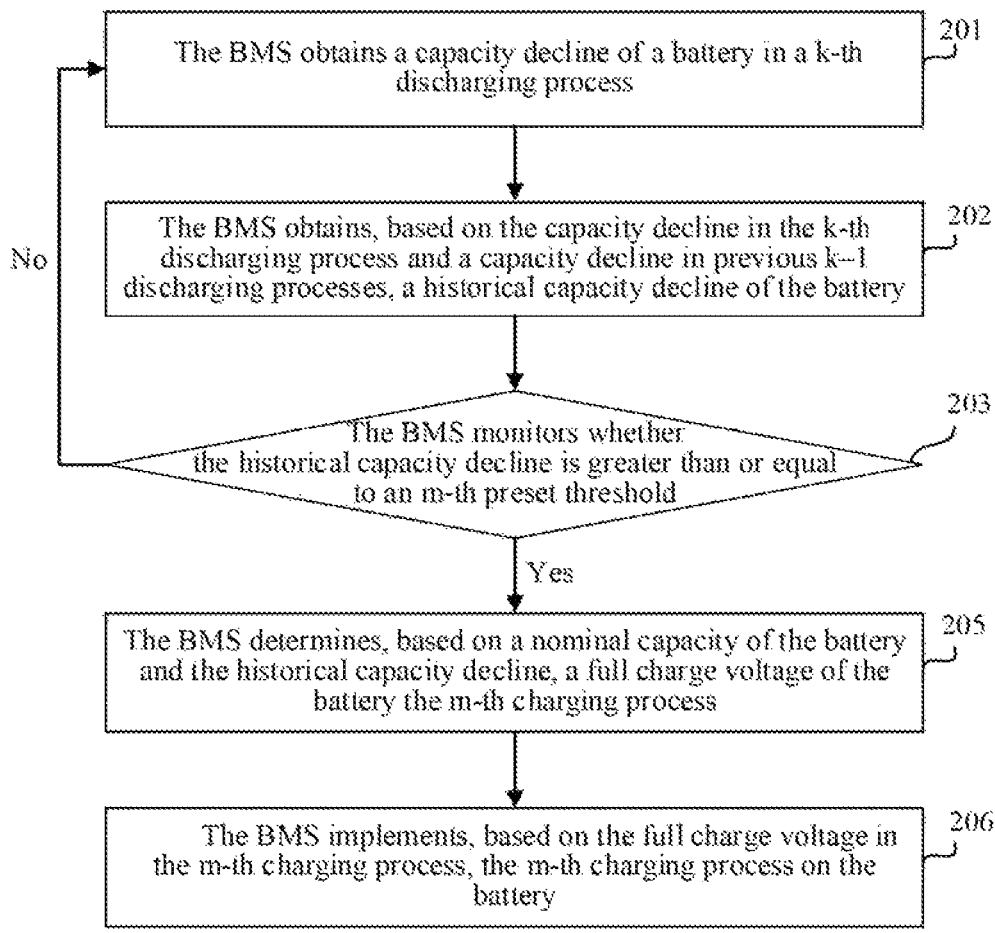
FIG. 2 is a flowchart of another charging method for battery according to an embodiment of this application.

FIG. 2 is a flowchart of another charging method for battery according to an embodiment of this application. Interacting bodies of the method are a BMS and a charging pile. As shown in FIG. 2, the method includes the following steps.

Step 201: The BMS obtains a capacity decline of a battery in a k-th discharging process.

It should be noted that a charging apparatus for battery in the embodiments of this application may be provided with a charging socket, and when a charging gun is inserted into the charging socket, the charging apparatus for battery may be charged, and when the charging gun is pulled out of the charging socket, charging of the charging apparatus for battery is ended. The BMS may monitor whether the charging gun is inserted or pulled out, and detect, based on the charging gun being inserted or pulled out, whether the charging apparatus for battery is in a charged state or a discharged state. For example, the BMS may determine a time when the charging gun is pulled out of the charging socket as an end time of an (m−1)-th charging state or a start time of the k-th discharging process, and determine a time when the charging gun is inserted into the charging socket next time as a start time of an m-th charging state or an end time of the k-th discharging process.

After leaving factory, the battery may be charged before being discharged, or may be discharged before being charged, or may be discharged multiple times before being charged once. Therefore, k may be greater than or equal to m or may be less than m. This is not limited in the embodiments of this application. Based on the relation between k and in, in an embodiment of this application, the charging and discharging processes of the battery may be divided into four scenarios. In a first scenario, k=m=1. In this scenario, the battery has a first discharging process first and then has a first charging process. In a second scenario, k>1, and m=1. In this scenario, the battery has k discharging processes first and then has a first charging process. In a third scenario, k=1, and m>1. In this scenario, the battery has m−1 charging processes first and then has a first discharging process. In a fourth scenario, k>1, and m>1. In this scenario, the battery has gone through m−1 discharging processes before experiencing the k-th discharging process.

No matter in which mode the battery is charged or discharged, the BMS can monitor the k-th discharging process of the charging apparatus for battery based on the charging gun being inserted or pulled out state, and obtain the capacity decline of the battery in the k-th discharging process.

For example, an implementation process of the BMS obtaining a capacity decline of a battery in a k-th discharging process may include: obtaining discharging parameters of the battery in the k-th discharging process, where the discharging parameters include average current, average temperature, battery capacity interval, and cumulative throughput, where an upper limit of the battery capacity interval is a battery capacity of the battery at the end of the (m−1)-th charging process, and a lower limit of the battery capacity interval is a battery capacity of the battery at the beginning of the m-th charging process; and obtaining, based on the average current, average temperature, battery capacity interval, and cumulative throughput of the battery in the k-th discharging process, the capacity decline of the battery in the k-th discharging process.

It should be noted that the BMS may start to collect the discharging parameters of the battery in the discharging process upon detection of the end of the (m−1)-th charging state of the battery, and stop collecting the discharging parameters upon detection of the beginning of the m-th charging state of the battery, so as to obtain the discharging parameters of the battery in the k-th discharging process. The BMS may collect the discharging parameters of the battery in the k-th discharging process in real time. Certainly, to reduce energy consumption for sampling, a sampling interval may alternatively be preset, and the discharging parameters are collected once every the preset sampling interval in the k-th discharging process. For example, the sampling interval may be 100 ms (millisecond), 110 ms, 150 ms, or the like. This is not limited in the embodiments of this application.

In addition, the cumulative throughput in the k-th discharging process is a sum of a total discharge capacity and a total recharge capacity in the k-th discharging process. For obtaining the cumulative throughput in the k-th discharging process, the total discharge capacity and the total recharge capacity in the k-th discharging process may be separately obtained, and then a sum or a weighted sum of the total discharge capacity and the total recharge capacity in the k-th discharging process is found as the cumulative throughput in the k-th discharging process.

For example, an implementation process of the obtaining, based on the average current, average temperature, battery capacity interval, and cumulative throughput of the battery in the k-th discharging process, the capacity decline of the battery in the k-th discharging process may include: determining, based on the average current, average temperature, battery capacity interval, and cumulative throughput of the battery in the k-th discharging process, the capacity decline in the k-th discharging process according to the following equation:

$$\Delta SOH_k = C_a \cdot e^{-\frac{Eb}{R}\left(\frac{1}{T}-\frac{1}{T_0}\right)} \cdot f(SOC_{upk}) \cdot f(SOC_{lowk}) \cdot f(C_k) \cdot \Delta C_k^z$$

where $\Delta SOH_k$ is the capacity decline in the k-th discharging process, $C_a$, Eb and z are predetermined constants of the battery, R is 8.314, T is the average temperature, $T_0$ is 298.15 degrees kelvin, $SOC_{upk}$ is the upper limit of the battery capacity interval in the k-th discharging process, $SOC_{lowk}$ is the lower limit of the battery capacity interval in the k-th discharging process, $C_k$ is the average current in the k-th discharging process, $\Delta C_k$ is the cumulative throughput in the k-th discharging process, $f(SOC_{upk})$ is a function associated with the upper limit of the battery capacity interval in the k-th discharging process, $f(SOC_{lowk})$ is a function associated with the lower limit of the battery capacity interval in the k-th discharging process, and $f(C_k)$ is a function associated with the average current in the k-th discharging process. These are not limited in the embodiments of this application.

Certainly, the capacity decline in the k-th discharging process may alternatively be determined based on the average current, average temperature, battery capacity interval, and cumulative throughput of the battery in the k-th discharging process in other manners. This is not limited in the embodiments of this application.

It is worth noting that, in this application, the capacity decline of the battery in the k-th discharging process can be precisely determined based on the average current, average temperature, battery capacity interval, and cumulative throughput in the k-th discharging process. For each discharging process of the battery, the BMS may obtain, in the manner for the k-th discharging process, the discharging parameters of each discharging process, and then determine, based on the discharging parameters of each discharging process, the capacity decline in each discharging process. Then, the BMS may store a correspondence among the discharging processes, the discharging parameters and the capacity declines in the discharging processes, for subsequent use.

Table 1 shows the correspondence among the discharging processes, the discharging parameters and the capacity declines in the discharging processes.

In the embodiments of this application, the correspondence shown in Table 1 is merely described as an example, and Table 1 does not constitute any limitation on the embodiments of this application.

Step 202: The BMS obtains, based on the capacity decline in the k-th discharging process and a capacity decline in previous k−1 discharging processes, a historical capacity decline of the battery.

The historical capacity decline is a sum of the capacity declines occurring to the battery in previous (for example, previous k) discharging processes before the m-th charging process. Therefore, the historical capacity decline of the battery may be determined based on the capacity decline in the k-th discharging process and the capacity decline in the previous k−1 discharging processes.

For example, the BMS may obtain the capacity decline in the previous K−1 discharging processes, and find a sum of the capacity decline in the k-th discharging process and the capacity decline in the previous k−1 discharging processes, as the historical capacity decline of the battery. Alternatively, the BMS may find a weighted sum of the capacity decline in the k-th discharging process and the capacity decline in the previous k−1 discharging processes, as the historical capacity decline of the battery. This is not limited in the embodiments of this application.

For obtaining the capacity decline in the previous k−1 discharging processes, the BMS may obtain the capacity decline in each discharging process of the previous k−1 discharging processes, and then finds a sum or weighted sum of the capacity declines in all discharging processes of the previous k−1 discharging processes, as the capacity decline in the previous k−1 discharging processes.

It is worth indicating that, when k=1, k−1=0, and the historical capacity decline of the battery is exactly the capacity decline in the first discharging process. Therefore, after the capacity decline of the battery in the first discharging process is obtained in step 201, step 203 may be directly executed without step 202.

Step 203: The BMS determines whether the historical capacity decline is greater than or equal to an m-th preset threshold.

Generally, the capacity decline of the battery in a single discharging process is comparatively small, even as small as a few millivolts. Therefore, to avoid resource consumption for frequently determining a full charge voltage of the battery in charging processes, after the historical capacity decline of the battery is obtained in step 202, the m-th preset threshold may further be set, and whether the historical capacity decline is greater than or equal to the m-th preset threshold is determined in step 203. When it is determined that the historical capacity decline is greater than or equal to

TABLE 1

| | Discharging parameter | | | | | |
|---|---|---|---|---|---|---|
| Discharging process | Upper limit of battery capacity interval ($SOC_{up}$) | Lower limit of battery capacity interval ($SOC_{low}$) | Average temperature (T) | Average current (C) | Cumulative throughout | Capacity decline in discharging process ($\Delta SOH$) |
| Discharge 1 | 90% SOC | 31.5% SOC | $T_1$ | $C_1$ | 0.585 | $\Delta SOH_1$ |
| Discharge 2 | 85% SOC | 43.9% SOC | $T_2$ | $C_2$ | 0.411 | $\Delta SOH_2$ |
| . . . | . . . | . . . | . . . | . . . | . . . | . . . |
| Discharge n | . . . | . . . | $T_n$ | $C_n$ | . . . | $\Delta SOH_n$ | the m-th preset threshold, step 205 is executed, and otherwise step 205 is not executed.

It should be noted that the m-th preset threshold is a preset threshold that corresponds to the m-th charging process. The m-th preset threshold may be preset, and the m-th preset threshold may be any positive number. For example, the m-th preset threshold may be 1%, 2%, or the like. This is not limited in the embodiments of this application.

For other charging processes, a preset threshold that corresponds to each charging process may be set. For example, for an (m−1)-th charging process, an (m−1)-th preset threshold may be set. For an (m+1)-th charging process, an (m+1)-th preset threshold may be set. The (m−1)-th charging process, the m-th charging process and the (m+1)-th charging process are described as examples. For preset thresholds corresponding to charging processes, in a possible scenario, all charging processes correspond to the same preset threshold. For example, the (m−1)-th preset threshold=the m-th preset threshold=the (m+1)-th preset threshold. In a second possible scenario, the preset threshold progressively increases along with the charging process. For example, the (m−1)-th preset threshold<the m-th preset threshold<the (m+1)-th preset threshold. In the second scenario, the preset threshold may progressively increase at a step size along with the charging process. For example, the (m−1)-th preset threshold=1%, the m-th preset threshold=2%, and the (m+1)-th preset threshold=3%. Alternatively, the preset threshold may not progressively increase at a particular step size. For example, the (m−1)-th preset threshold=1%, the m-th preset threshold=1.5%, and the (m+1)-th preset threshold=4%. This is not limited in the embodiments of this application.

Step 204: When determining that the historical capacity decline is greater than or equal to the m-th preset threshold, the BMS executes step 205, and otherwise, return to execute step 201 again.

When determining that the historical capacity decline is greater than or equal to the m-th preset threshold, the BMS determines the full charge voltage of the battery in the m-th charging process based on a nominal capacity of the battery and the historical capacity decline. When determining that the historical capacity decline is less than the m-th preset threshold, the BMS does not determines the full charge voltage of the battery in the m-th charging process based on the nominal capacity of the battery and the historical capacity decline, but executes the step of obtaining a capacity decline of a battery in a k-th discharging process again.

It is worth noting that, in the embodiments of this application, the full charge voltage of the battery in the m-th charging process is determined only when the BMS determines that the historical capacity decline has reached the m-th preset threshold. In this way, resource consumption for frequently determining a full charge voltage of the battery in charging processes can be avoided.

Step 205: The BMS determines, based on a nominal capacity of the battery and the historical capacity decline, a full charge voltage of the battery in the m-th charging process.

It should be noted that a start time of the m-th charging process of the battery is a start time of the m-th charging state of the battery, and an end time of the m-th charging process is an end time of the m-th charging state.

Initial full charge voltages and nominal capacities of batteries are meant for fresh batteries. The initial full charge voltage of a battery is a full charge voltage with no decline of the battery capacity, and the initial full charge voltage corresponds to the nominal capacity. That is, when a fresh battery is charged to its initial full charge voltage, power that can be discharged by the fresh battery is equal to the nominal capacity. The nominal capacity refers to a minimum level of power that the battery should discharge under certain discharging conditions, as stipulated or guaranteed when the battery is designed and made. Historical capacity declines, however, are meant for aged batteries.

For example, an implementation process of step 205 may include: obtaining, based on the nominal capacity and the historical capacity decline, a capacity that the battery needs to reach in the m-th charging process; and obtaining, based on the capacity that the battery needs to reach in the m-th charging process, the full charge voltage of the battery in the m-th charging process.

For obtaining, based on the nominal capacity and the historical capacity decline, the capacity that the battery needs to reach in the m-th charging process, in a possible implementation, the BMS may find a sum of the nominal capacity and the historical capacity decline, as the capacity that the battery needs to reach in the m-th charging process. In another possible implementation, a weighted sum of the nominal capacity and the historical capacity decline may be found as the capacity that the battery needs to reach in the m-th charging process. This is not specifically limited in the embodiments of this application.

In addition, for obtaining, based on the capacity that the battery needs to reach in the m-th charging process, the full charge voltage of the battery in the m-th charging process, the BMS may obtain a correspondence between open-circuit voltages and capacities of the battery, and obtain, based on the capacity that the battery needs to reach in the m-th charging process and the correspondence between open-circuit voltages and capacities, the full charge voltage of the battery in the n-th charging process.

It should be noted that the correspondence between open-circuit voltages and capacities may be characterized by an open-circuit voltage-capacity curve (shown in FIG. 3), the open-circuit voltage-capacity curve may be obtained by testing discharging of multiple fresh batteries of a same batch in the same way, and therefore the open-circuit voltage-capacity curve characterizes a correspondence between open-circuit voltages and capacities of the fresh batteries. The open-circuit voltage-capacity curve of the battery has multiple coordinate points. Each of the multiple coordinate points has a transverse coordinate and a longitudinal coordinate, where the transverse coordinate represents capacity, and the longitudinal coordinate represents voltage.

The historical capacity decline refers to a sum of capacity declines occurring to the battery in previous (for example, previous k) discharging processes before the m-th charging process. In other words, the historical capacity decline means for how much the battery capacity declines relative to the fresh battery after the previous k discharging processes before the m-th charging process. In the embodiments of this application, the capacity that the battery needs to reach in the m-th charging process is obtained based on the nominal capacity and the historical capacity decline, and the battery going through k discharging processes (also referred to as aged battery) may be compensated for the capacity decline relative to the fresh battery, so as to reach the capacity that the battery needs to reach in the m-th charging process. Subsequently, after the full charge voltage of the battery in the m-th charging process is determined based on the capacity that the battery needs to reach in the m-th charging process, the m-th charging process is implemented on the battery based on the full charge voltage in the m-th charging process, so that the battery capacity does not decline relative to the fresh battery.

After the capacity that the battery needs to reach in the m-th charging process is obtained, a coordinate point with a capacity equal to the capacity that the battery needs to reach in the m-th charging process may be determined on the open-circuit voltage-capacity curve of the battery, and a longitudinal coordinate of that coordinate point is exactly the full charge voltage of the battery in the m-th charging process.

Figure 3:
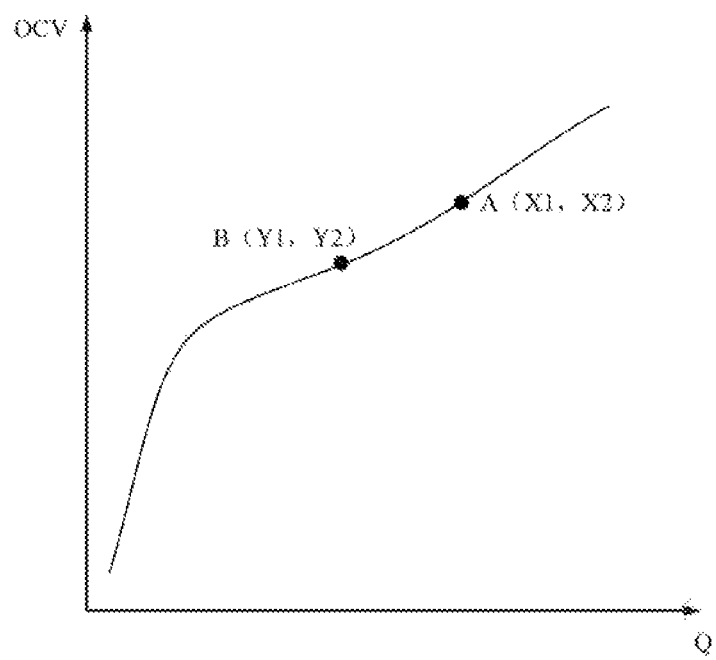
FIG. 3 is a diagram illustrating correspondence between open-circuit voltages and discharge capacities according to an embodiment of this application.

FIG. 3 is a schematic diagram illustrating an open-circuit voltage-capacity curve of a fresh battery according an embodiment of this application. Referring to FIG. 3, point A is a coordinate point in the open-circuit voltage-capacity curve of the battery that is determined to present a capacity equal to the capacity that the battery needs to reach in the m-th charging process. A transverse coordinate of point A is X1, and a longitudinal coordinate thereof is Y1, where X1 is equal to the capacity that the battery needs to reach in the m-th charging process, and Y1 is equal to the full charge voltage of the battery in the m-th charging process. A transverse coordinate of point B is X2, and a longitudinal coordinate thereof is Y2, where X2 is equal to the nominal capacity of the battery, and Y2 is equal to the initial full charge voltage of the battery. A difference between X1 and X2 is the historical capacity decline of the battery. A difference between Y1 and Y2 is a value by which the full charge voltage of the battery in the m-th charging process increases relative to the initial full charge voltage, and this value may be referred to as an open voltage. It can be seen that, in the embodiments of this application, the open voltage is added to the initial full charge voltage, to obtain the full charge voltage of the battery in the m-th charging process. Subsequently, discharging is performed after the battery is charged for the m-th time based on the full charge voltage of the battery in the m-th charging process, to compensate for the capacity decline that corresponds to the open voltage and ensure that the battery capacity does not decline.

It is worth noting that, in this application, the full charge voltage of the battery in the m-th charging process is determined based on the nominal capacity of the battery and the historical capacity decline. The historical capacity decline of the battery increases constantly along with use of the battery. Therefore, in this application, the full charge voltage of the battery in the charging process also increases constantly without being fixed. This improves accuracy of the determined full charge voltage.

It should be noted that, in the embodiments of this application, after the historical capacity decline of the battery is obtained in step 201 and step 202, step 203 and step 204 may alternatively be not executed, and the full charge voltage of the battery in the m-th charging process is directly determined in step 205. This is not limited in the embodiments of this application.

After the full charge voltage of the battery in the m-th charging process is determined in the foregoing steps, the m-th charging process may be implemented on the battery as in step 206 below.

Step 206: The BMS implements, based on the full charge voltage in the m-th charging process, the m-th charging process on the battery.

For example, an implementation process of step 206 may include: monitoring an actual voltage of the battery in the process of charging the battery; determining whether the actual voltage has risen to the full charge voltage of the battery in the m-th charging process; and stopping charging the battery when it is determined that the actual voltage has risen to the full charge voltage of the battery in the m-th charging process.

Further, when it is determined that the actual voltage has not risen to the full charge voltage of the battery in the m-th charging process, the battery continues being charged, and the step of monitoring an actual voltage of the battery in the process of charging the battery is executed again. In this way, it can be guaranteed that the battery is fully charged to the full charge voltage in the m-th charging process, thereby guaranteeing that the capacity does not decline in subsequent discharging.

In the embodiments of this application, the BMS may communicate with the charging pile. When determining that the actual voltage has risen to the full charge voltage of the battery in the m-th charging process, the BMS may send an instruction for ending charging to the charging pile. Accordingly, the charging pile may receive the instruction and control, according to the instruction, the charging gun to be pulled out of the charging socket, to stop charging the battery. When determining that the actual voltage has not risen to the full charge voltage in the m-th charging process, the BMS does not send an instruction for ending charging to the charging pile, but continues monitoring the actual voltage of the battery in the charging process until it is determined that the actual voltage has risen to the full charge voltage in the m-th charging process, then sends the instruction for ending charging to the charging pile.

In the process of charging the battery, the actual voltage of the battery may be monitored in real time. However, charging is not completed instantly, but requires a process. Therefore, time intervals may be preset, the actual voltage may be monitored at longer time intervals in an early period of charging, and monitored at shorter time intervals in a later period of charging.

For example, assuming that a total time of a charging process is t, early $\frac{2}{3}$t of the charging process is an early period of charging, and the late $\frac{1}{3}$t of the charging process is a later period of charging, a first time interval and a second time interval may be set. The first time interval is greater than the second time interval. In early $\frac{2}{3}$t of the charging process, the actual voltage is monitored once every the first time interval. In the late $\frac{1}{3}$t of the charging process, the actual voltage is monitored once every the second time interval. In this way, high energy consumption for frequently monitoring the actual voltage can be avoided.

Certainly, in the embodiments of this application, the first time interval may alternatively be equal to the second time interval. In addition, the embodiments of this application are not limited a charging process being divided into an early period of charging and a later period of charging, and a charging process may alternatively be divided into more than two charging periods, for example, divided into 3 charging periods, 4 charging periods, 5 charging periods, or the like. Accordingly, 3 time intervals, 4 time intervals, 5 time intervals, or the like may be correspondingly set.

Further, in some embodiments, as the battery constantly ages with the discharging, the historical capacity decline increases constantly. When a value of m is comparatively large, the full charge voltage of the battery in the m-th charging process is also comparatively large. When the full charge voltage of the battery in the m-th charging process continues to increase to a certain extent along with the increase of the value of m, if the battery continues to be charged at the full charge voltage of the battery in the m-th charging process, safety problems of the battery in use may be caused. Therefore, a preset upper limit of voltage of the battery may be set. Before step 206, whether the full charge voltage in the m-th charging process is less than or equal to the preset upper limit of voltage of the battery may be determined. When it is determined that the full charge voltage in the m-th charging process is less than or equal to the preset upper limit of voltage of the battery, step 206 is executed. When it is determined that the full charge voltage in the m-th charging process is greater than the preset upper limit of voltage of the battery, the m-th charging process is implemented on the battery based on the preset upper limit of voltage.

It should be noted that, the preset upper limit of voltage may be preset, and may be set based on properties of the battery. The preset upper limit of voltage may be greater than the nominal capacity, and the preset upper limit of voltage may be a maximum voltage that the battery can reach in charging on the premise of guaranteeing safe use of the battery.

In the embodiments of this application, the historical capacity decline is considered, the full charge voltage is determined based on the historical capacity decline, and then the battery is charged based on the determined full charge voltage. The historical capacity decline increases constantly along with use of the battery. Therefore, in this application, the full charge voltage of the battery in the charging process also increases constantly, or the full charge voltage is opened constantly. In this way, the decline of the battery capacity can be compensated for at each time of charging, so that the battery truly reaches full charge, thereby guaranteeing that the capacity of the battery does not decline at discharging.

For ease of understanding, the following exemplifies the charging method for battery in the four charging and discharging scenarios mentioned in the foregoing embodiment.

In the first discharging scenario, k=m=1, that is, the battery has gone through one discharging process, and is going to have the first charging process. In this case, the BMS obtains a capacity decline of the battery in the first discharging process, where the capacity decline in the first discharging process is exactly the historical capacity decline of the battery, then a full charge voltage of the battery in the first charging process is determined based on the nominal capacity of the battery and the capacity decline in the first discharging process, and finally the first charging process is implemented on the battery based on the full charge voltage in the first charging process.

In the second discharging scenario, k>1, and m=1, that is, the battery has gone through k discharging processes, and is going to have the first charging process. In an example of k=3, the BMS obtains a capacity decline of the battery in the third discharging process, then a historical capacity decline of the battery is obtained based on the capacity decline in the third discharging process and a capacity decline in the previous 2 discharging processes, after that, a full charge voltage of the battery in the first charging process is determined based on the nominal capacity of the battery and the historical capacity decline, and finally the first charging process is implemented on the battery based on the full charge voltage in the rust charging process.

In the third discharging scenario, k=m, and m>1, that is, the battery has gone through one discharging process, and is going to have the m-th charging process. In an example of m=2, the BMS obtains a capacity decline of the battery in the first discharging process, where the capacity decline in the first discharging process is exactly the historical capacity decline of the battery, then a full charge voltage of the battery in the second charging process is determined based on the nominal capacity of the battery and the capacity decline in the first discharging process, and finally the second charging process is implemented on the battery based on the full charge voltage in the second charging process.

In the fourth discharging scenario, k>1, and m>1, that is, the battery has gone through k discharging processes, and is going to have the m-th charging process. In an example of k=2 and m=3, the BMS obtains a capacity decline of the battery in the second discharging process, then a historical capacity decline of the battery is obtained based on the capacity decline in the second discharging process and a capacity decline in the first discharging processes, after that, a full charge voltage of the battery in the third charging process is determined based on the nominal capacity of the battery and the historical capacity decline, and finally the third charging process is implemented on the battery based on the full charge voltage in the third charging process.

Figure 4:
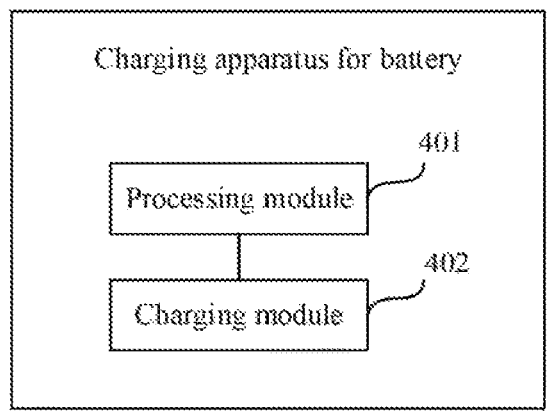
FIG. 4 is a schematic structural diagram of a charging apparatus for battery according to an embodiment of this application.

FIG. 4 is a schematic structural diagram of a charging apparatus for battery according to an embodiment of this application. As shown in FIG. 4, the charging apparatus for battery according to the embodiment of this application includes a processing module 401 and a charging module 402.

The processing module 401 is configured to obtain a capacity decline of a battery in a k-th discharging process, where a start time of the k-th discharging process is an end time of an (m−1)-th charging state of the battery, and an end time of the k-th discharging process is a start time of an m-th charging state of the battery, where k is an integer greater than or equal to 1, and m is an integer greater than or equal to 1.

The processing module 401 is further configured to obtain, based on the capacity decline in the k-th discharging process and a capacity decline in previous k−1 discharging processes, a historical capacity decline of the battery.

The processing module 401 is further configured to determine, based on a nominal capacity of the battery and the historical capacity decline, a full charge voltage of the battery in the m-th charging process.

The charging module 402 is configured to implement, based on the full charge voltage in the m-th charging process, the m-th charging process on the battery.

Optionally, the processing module 401 is configured to: obtain discharging parameters of the battery in the k-th discharging process, where the discharging parameters include average current, average temperature, battery capacity interval, and cumulative throughput, where an upper limit of the battery capacity interval is a battery capacity of the battery at the end of the (m−1)-th charging process, and a lower limit of the battery capacity interval is a battery capacity of the battery at the beginning of the m-th charging process; and obtain, based on the average current, average temperature, battery capacity interval, and cumulative throughput of the battery in the k-th discharging process, the capacity decline of the battery in the k-th discharging process.

Optionally, the processing module 401 is configured to: determine, based on the average current, average temperature, battery capacity interval, and cumulative throughput of the battery in the k-th discharging process, the capacity decline in the k-th discharging process according to the following equation:

$$\Delta SOH_k = C_a \cdot e^{-\frac{Eb}{R}\left(\frac{1}{T} - \frac{1}{T_0}\right)} \cdot f(SOC_{upk}) \cdot f(SOC_{lowk}) \cdot f(C_k) \cdot \Delta C_k^2$$

where $\Delta SOH_k$ is the capacity decline in the k-th discharging process, $C_a$, Eb and z are predetermined constants of the battery, R is 8.314, T is the average temperature, $T_0$ is 298.15 degrees kelvin, $SOC_{upk}$ is the upper limit of the battery capacity interval in the k-th discharging process, $SOC_{lowk}$ is the lower limit of the battery capacity interval in the k-th discharging process, $C_k$ is the average current in the k-th discharging process, and $\Delta C_k$ is the cumulative throughput in the k-th discharging process.

Optionally, the processing module 401 is configured to: obtain, based on the nominal capacity and the historical capacity decline, a capacity that the battery needs to reach in the m-th charging process; and obtain, based on the capacity that the battery needs to reach in the m-th charging process, the full charge voltage of the battery in the m-th charging process.

Optionally, the processing module 401 is configured to: under the condition that the historical capacity decline is greater than or equal to an m-th preset threshold, determine, based on the nominal capacity of the battery and the historical capacity decline, the full charge voltage of the battery in the m-th charging process.

Optionally, the charging module 402 is configured to: monitor an actual voltage of the battery in the process of charging the battery, determine whether the actual voltage has risen to the full charge voltage of the battery in the m-th charging process; and stop charging the battery when it is determined that the actual voltage has risen to the full charge voltage of the battery in the m-th charging process.

In the embodiments of this application, the historical capacity decline is considered, the full charge voltage is determined based on the historical capacity decline, and then the battery is charged based on the determined full charge voltage. The historical capacity decline increases constantly along with use of the battery. Therefore, in this application, the full charge voltage of the battery in the charging process also increases constantly, or the full charge voltage is opened constantly. In this way, the decline of the battery capacity can be compensated for at each time of charging, so that the battery truly reaches full charge, thereby guaranteeing that the capacity of the battery does not decline at discharging.

For the apparatus in this embodiment, how the modules specifically implement the operations has been described in the embodiments of the method in detail, and no further elaboration is provided herein.

It should be understood that, the units in the apparatus are separated based on merely logical functions. In a specific implementation, the units may be all or partly integrated in one physical entity, or may be physically separated. In addition, the units in the apparatus may be implemented all in a form of software for calling by processing elements, or maybe implemented all in a form of hardware, or may be implemented partly in a form of software for calling by processing elements and partly in a form of hardware. For example, each unit may be a separate processing element, or may be integrated in a given chip of the apparatus. In addition, each unit may alternatively be stored in a memory in a form of program for calling by a given processing element of the apparatus to implement functions of the unit. In addition, these units may be all or partly integrated, or may be implemented separately. The processing element herein may be an integrated circuit capable of signal processing. In an implementation process, the steps of the foregoing method or the foregoing units may be implemented through integrated logic circuits of hardware in the processing elements, or may be implemented in a form of software called by the processing elements.

An embodiment of this application further provides a battery. The battery includes the charging apparatus for battery according to the embodiment shown in FIG. 4.

An embodiment of this application further provides an electric apparatus. The electric apparatus includes a battery. The battery is configured to provide electric energy. The electric apparatus charges the battery using the charging method for battery according to the embodiments shown in FIG. 1 to FIG. 3.

Figure 5:
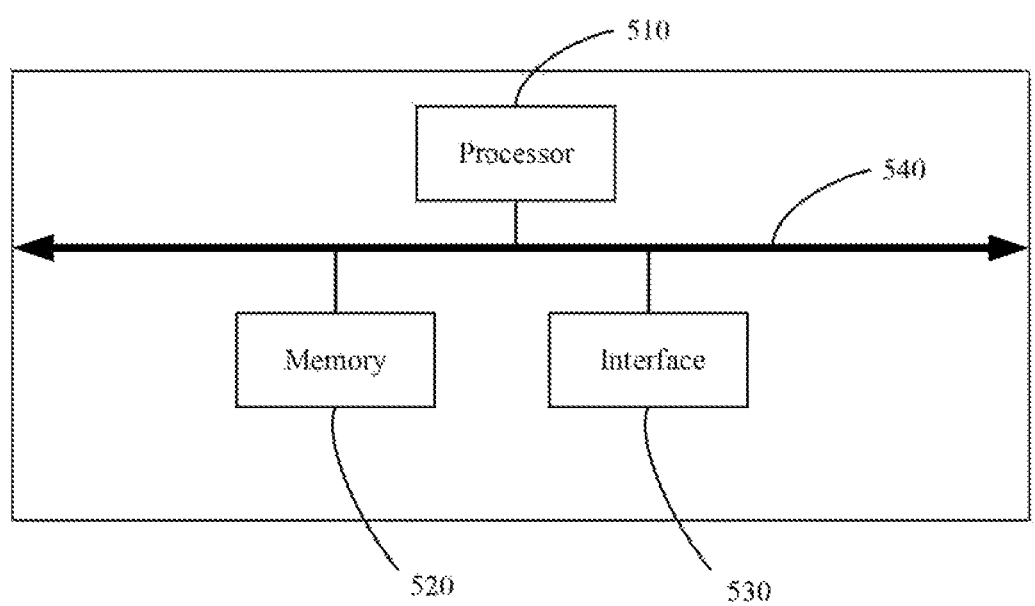
FIG. 5 is a schematic structural diagram of another charging apparatus for battery according to an embodiment of this application.

FIG. 5 is a schematic structural diagram of another charging apparatus for battery according to an embodiment of this application. Referring to FIG. 5, the charging apparatus for battery includes a processor 510, a memory 520, and an interface 530. The processor 510, memory 520, and interface 530 are connected through a bus 540. The bus may be implemented through connecting circuits. The memory 520 is configured to store a program. When the program is called by the processor 510, the method executed by a charging apparatus for battery in the foregoing embodiments may be implemented. The interface 530 is configured to communicate with another charging apparatus for battery. The interface 530 may communicate with another charging apparatus for battery through a wired connection or a wireless connection.

Functions of the units of the foregoing charging apparatus for battery may be implemented by the processor 510 calling the program stored in the memory 520. That is, the charging apparatus for battery includes a processor 510 and a memory 520. The memory 520 is configured to store a program. When the program is called by the processor 510, the method a in the foregoing method embodiments is implemented. The processor 510 herein may be a general-purpose processor or other processors capable of calling a program. Alternatively, the processor 510 may be configured as one or more integrated circuits to implement the method executed by a charging apparatus for battery in the foregoing embodiments, for example, as one or more application specific integrated circuits (ASIC), one or more digital signal processors (DSP), or one or more field programmable gate arrays (FPGA) or other programmable logic devices, discrete gates or transistor logic devices, discrete hardware components, or the like. For another example, in a case that the units in the charging apparatus for battery may be implemented by a processor calling a program, the processor 510 may be a general-purpose processor, for example, a central processing unit (CPU), a controller, a microcontroller, a single-chip microcomputer, or other processors capable of calling a program. For another example, these units may be integrated, to be implemented as a system on chip.

The memory 520 is not limited in quantity, and may be provided in a quantity of one or more.

The memory 520 includes at least one type of readable storage medium. The readable storage medium includes a non-volatile memory or a volatile memory, for example, a flash memory, a hard disk, a multimedia card, a disk memory (for example, SD or DX memory), a random access memory (RAM), a read-only memory (ROM), an erasable programmable read-only memory (EPROM), an electrically erasable programmable read-only memory (EEPROM), a programmable read-only memory (PROM), a magnetic memory, a magnetic disk, a compact disc, or the like. The RAM may include a static RAM or a dynamic RAM. In some embodiments, the memory 520 may be an internal storage device of the apparatus, for example, a hard disk or internal memory of the apparatus. In other embodiments, the memory 520 may alternatively be an external storage device of the apparatus, for example, a plug-in hard disk, a smart media card (SMC), a secure digital (SD) card, a flash card, or the like that the apparatus is provided with. Certainly, the memory 520 may alternatively include both an internal storage device of the apparatus and an external storage device of the apparatus. In this embodiment, the memory 520 is generally configured to store an operating system and various application software that are installed on the apparatus, for example, program code of the charging method for battery. In addition, the memory 520 may further be configured to temporarily store various data that has been output or that is to be output.

The bus 540 may be an industry standard architecture (ISA) bus, a peripheral component interconnect (PCI) bus, an extended industry standard architecture (EISA) bus, or the like. The bus 540 may include an address bus, a data bus, a control bus, or the like. For ease of illustration, the bus is represented by only one bold line in the figure, but this does not indicate that there is only one bus or only one type of bus.

Generally, the processor 510 is configured to control overall operations of the apparatus. In this embodiment, the memory 520 is configured to store program code or instructions. The program code includes computer operation instructions. The processor 510 is configured to execute the program code or instructions stored in the memory 520, or to process data, for example, to run the program code of the charging method for battery.

To sum up, in the embodiments of this application, the historical capacity decline is considered, the full charge voltage is determined based on the historical capacity decline, and then the battery is charged based on the determined full charge voltage. The historical capacity decline increases constantly along with use of the battery. Therefore, in this application, the full charge voltage of the battery in the charging process also increases constantly, or the full charge voltage is opened constantly. In this way, the decline of the battery capacity can be compensated for at each time of charging, so that the battery truly reaches full charge, thereby guaranteeing that the capacity of the battery does not decline at discharging.

A person skilled in the art can understand that, although some embodiments herein include some features included in other embodiments rather than other features, combinations of features of different embodiments are meant to be within the scope of this application and to form different embodiments. For example, in the claims, any one of the claimed embodiments may be used in any combination.

In conclusion, it should be noted that the foregoing embodiments are merely intended for describing the technical solutions of this application, but not for limiting this application. Although this application is described in detail with reference to the foregoing embodiments, a person of ordinary skills in the art should understand that they may still make modifications to the technical solutions described in the foregoing embodiments or make equivalent replacements to some technical features thereof, without departing from the scope of the technical solutions of the embodiments of this application.

What is claimed is:

1. A method for charging a battery, comprising:
obtaining a capacity decline of the battery in a k-th discharging process, wherein the capacity decline is a change of state of health (SOH) of the battery in the k-th discharging process, wherein a start time of the k-th discharging process is an end time of an (m−1)-th charging process of the battery, and an end time of the k-th discharging process is a start time of an m-th charging process of the battery, wherein k is an integer greater than 1, and m is an integer greater than or equal to 1;

obtaining, based on the capacity decline in the k-th discharging process and capacity declines in previous k−1 discharging processes, a historical capacity decline of the battery, wherein the historical capacity decline is a sum of the capacity declines in the k discharging processes;

determining, based on a nominal capacity of the battery and the historical capacity decline of the battery, a full charge voltage of the battery in the m-th charging process; and performing, based on the full charge voltage of the battery in the m-th charging process, the m-th charging process on the battery;

wherein obtaining the capacity decline of the battery in the k-th discharging process comprises:
obtaining discharging parameters of the battery in the k-th discharging process, wherein the discharging parameters comprise an average current, an average temperature, a battery capacity interval, and a cumulative throughput, wherein an upper limit of the battery capacity interval is a battery capacity of the battery at the end of the (m−1)-th charging process, and a lower limit of the battery capacity interval is a battery capacity of the battery at the beginning of the m-th charging process; and determining, based on the average current, the average temperature, the battery capacity interval, and the cumulative throughput of the battery in the k-th discharging process, the capacity decline in the k-th discharging process according to the following equation:

$$\Delta SOH_k = C_a \cdot e^{-\frac{Eb}{R}\left(\frac{1}{T}-\frac{1}{T_0}\right)} \cdot f(SOC_{upk}) \cdot f(SOC_{lowk}) \cdot f(C_k) \cdot \Delta C_k^z$$

wherein $\Delta SOH_k$ is the capacity decline in the k-th discharging process, $C_a$, Eb and z are predetermined constants of the battery, R is 8.314, T is the average temperature, $T_0$ is 298.15 degrees kelvin, $SOC_{upk}$ is the upper limit of the battery capacity interval in the k-th discharging process, $SOC_{lowk}$ is the lower limit of the battery capacity interval in the k-th discharging process, $C_k$ is the average current in the k-th discharging process, $\Delta C_k$ is the cumulative throughput in the k-th discharging process, $f(SOC_{upk})$ is a function associated with the upper limit of the battery capacity interval in the k-th discharging process, $f(SOC_{lowk})$ is a function associated with the lower limit of the battery capacity interval in the k-th discharging process, and $f(C_k)$ is a function associated with the average current in the k-th discharging process.

2. The method according to claim 1, wherein determining, based on a nominal capacity of the battery and the historical capacity decline, a full charge voltage of the battery in the m-th charging process comprises:
obtaining, based on the nominal capacity and the historical capacity decline, a capacity that the battery needs to reach in the m-th charging process; and obtaining, based on the capacity that the battery needs to reach in the m-th charging process, the full charge voltage of the battery in the m-th charging process.

3. The method according to claim 1, wherein determining, based on a nominal capacity of the battery and the historical capacity decline, a full charge voltage of the battery in the m-th charging process comprises:
- under the condition that the historical capacity decline is greater than or equal to an m-th preset threshold, determining, based on the nominal capacity of the battery and the historical capacity decline, the full charge voltage of the battery in the m-th charging process.

4. The method according to claim 1, wherein performing, based on the full charge voltage of the battery in the m-th charging process, the m-th charging process on the battery comprises:
- monitoring an actual voltage of the battery in the m-th charging process on the battery;
- determining whether the actual voltage has risen to the full charge voltage of the battery in the m-th charging process; and
- stopping charging the battery when it is determined that the actual voltage has risen to the full charge voltage of the battery in the m-th charging process.

5. An apparatus for charging a battery, comprising:
a processor and a charging circuit;
wherein the processor is configured to:
- obtain a capacity decline of the battery in a k-th discharging process, wherein the capacity decline is a change of state of health (SOH) of the battery in the k-th discharging process, wherein a start time of the k-th discharging process is an end time of an (m−1)-th charging process of the battery, and an end time of the k-th discharging process is a start time of an m-th charging process of the battery, wherein k is an integer greater than 1, and m is an integer greater than or equal to 1;
- obtain, based on the capacity decline in the k-th discharging process and capacity declines in previous k−1 discharging processes, a historical capacity decline of the battery, wherein the historical capacity decline is a sum of the capacity declines in the k discharging processes; and
- determine, based on a nominal capacity of the battery and the historical capacity decline of the battery, a full charge voltage of the battery in the m-th charging process; and
wherein the charging circuit is configured to perform, based on the full charge voltage of the battery in the m-th charging process, the m-th charging process on the battery;
wherein in obtaining the capacity decline of the battery in the k-th discharging process, the processor is configured to:
- obtain discharging parameters of the battery in the k-th discharging process, wherein the discharging parameters comprise an average current, an average temperature a battery capacity interval, and a cumulative throughput, wherein an upper limit of the battery capacity interval is a battery capacity of the battery at the end of the (m−1)-th charging process and a lower limit of the battery capacity interval is a battery capacity of the battery at the beginning of the m-th charging process; and
- determine, based on the average current, the average temperature, the battery capacity interval, and the cumulative throughput of the battery in the k-th discharging process, the capacity decline in the k-th discharging process according to the following equation:

$$\Delta SOH_k = C_a \cdot e^{-\frac{Eb}{R}\left(\frac{1}{T} - \frac{1}{T_0}\right)} \cdot f(SOC_{upk}) \cdot f(SOC_{lowk}) \cdot f(C_k) \cdot \Delta C_k^z$$

wherein $\Delta SOH_k$ is the capacity decline in the k-th discharging process, $C_a$, $Eb$ and $z$ are predetermined constants of the battery, R is 8.314, T is the average temperature, $T_0$ is 298.15 degrees kelvin, $SOC_{upk}$ is the upper limit of the battery capacity interval in the k-th discharging process, $SOC_{lowk}$ is the lower limit of the battery capacity interval in the k-th discharging process, $C_k$ is the average current in the k-th discharging process, $\Delta C_k$ is the cumulative throughput in the k-th discharging process, $f(SOC_{upk})$ is a function associated with the upper limit of the battery capacity interval in the k-th discharging process, $f(SOC_{lowk})$ is a function associated with the lower limit of the battery capacity interval in the k-th discharging process, and $f(C_k)$ is a function associated with the average current in the k-th discharging process.

6. The apparatus according to claim 5, wherein in determining, based on a nominal capacity of the battery and the historical capacity decline, a full charge voltage of the battery in the m-th charging process, the processor is configured to:
- obtain, based on the nominal capacity and the historical capacity decline, a capacity that the battery needs to reach in the m-th charging process; and
- obtain, based on the capacity that the battery needs to reach in the m-th charging process, the full charge voltage of the battery in the m-th charging process.

7. The apparatus according to claim 5, wherein in determining, based on a nominal capacity of the battery and the historical capacity decline, a full charge voltage of the battery in the m-th charging process, the processor is configured to:
- under the condition that the historical capacity decline is greater than or equal to an m-th preset threshold, determine, based on the nominal capacity of the battery and the historical capacity decline, the full charge voltage of the battery in the m-th charging process.

8. The apparatus according to claim 5, wherein in performing, based on the full charge voltage of the battery in the m-th charging process, the m-th charging process on the battery, the charging circuit is configured to:
- monitor an actual voltage of the battery in the m-th charging process on the battery;
- determine whether the actual voltage has risen to the full charge voltage of the battery in the m-th charging process; and
- stop charging the battery when it is determined that the actual voltage has risen to the full charge voltage of the battery in the m-th charging process.

9. A battery, comprising a charging apparatus, wherein the charging apparatus is configured to:
- obtain a capacity decline of the battery in a k-th discharging process, wherein the capacity decline is a change of state of health (SOH) of the battery in the k-th discharging process, wherein a start time of the k-th discharging process is an end time of an (m−1)-th charging process of the battery, and an end time of the k-th discharging process is a start time of an m-th charging process of the battery, wherein k is an integer greater than 1, and m is an integer greater than or equal to 1;

obtain, based on the capacity decline in the k-th discharging process and capacity declines in previous k−1 discharging processes, a historical capacity decline of the battery, wherein the historical capacity decline is a sum of the capacity declines in the k discharging processes;

determine, based on a nominal capacity of the battery and the historical capacity decline of the battery, a full charge voltage of the battery in the m-th charging process; and perform, based on the full charge voltage of the battery in the m-th charging process, the m-th charging process on the battery;

wherein in obtaining the capacity decline of the battery in the k-th discharging process, the charging apparatus is configured to:

obtain discharging parameters of the battery in the k-th discharging process, wherein the discharging parameters comprise an average current an average temperature, a battery capacity interval, and a cumulative throughput, wherein an upper limit of the battery capacity interval is a battery capacity of the battery at the end of the (m−1)-th charging process, and a lower limit of the battery capacity interval is a battery capacity of the battery at the beginning of the m-th charging process; and determine, based on the average current, the average temperature, the battery capacity interval, and the cumulative throughput of the battery in the k-th discharging process, the capacity decline in the k-th discharging process according to the following equation:

$$\Delta SOH_k = C_a \cdot e^{-\frac{Eb}{R}\left(\frac{1}{T}-\frac{1}{T_0}\right)} \cdot f(SOC_{upk}) \cdot f(SOC_{lowk}) \cdot f(C_k) \cdot \Delta C_k^z$$

wherein $\Delta SOH_k$ is the capacity decline in the k-th discharging process, $C_a$, $Eb$ and $z$ are predetermined constants of the battery, $R$ is 8.314, $T$ is the average temperature, $T_0$ is 298.15 degrees kelvin, $SOC_{upk}$ is the upper limit of the battery capacity interval in the k-th discharging process, $SOC_{lowk}$ is the lower limit of the battery capacity interval in the k-th discharging process, $C_k$ is the average current in the k-th discharging process, $\Delta C_k$ is the cumulative throughput in the k-th discharging process, $f(SOC_{upk})$ is a function associated with the upper limit of the battery capacity interval in the k-th discharging process, $f(SOC_{lowk})$ is a function associated with the lower limit of the battery capacity interval in the k-th discharging process, and $f(C_k)$ is a function associated with the average current in the k-th discharging process.

10. The battery according to claim 9, wherein in determining, based on a nominal capacity of the battery and the historical capacity decline, a full charge voltage of the battery in the m-th charging process, the charging apparatus is configured to:

obtain, based on the nominal capacity and the historical capacity decline, a capacity that the battery needs to reach in the m-th charging process; and obtain, based on the capacity that the battery needs to reach in the m-th charging process, the full charge voltage of the battery in the m-th charging process.

11. The battery according to claim 9, wherein in determining, based on a nominal capacity of the battery and the historical capacity decline, a full charge voltage of the battery in the m-th charging process, the charging apparatus is configured to:

under the condition that the historical capacity decline is greater than or equal to an m-th preset threshold, determine, based on the nominal capacity of the battery and the historical capacity decline, the full charge voltage of the battery in the m-th charging process.

12. The battery according to claim 9, wherein in performing, based on the full charge voltage of the battery in the m-th charging process, the m-th charging process on the battery, the charging apparatus is configured to:

monitor an actual voltage of the battery in the m-th charging process on the battery;

determine whether the actual voltage has risen to the full charge voltage of the battery in the m-th charging process; and stop charging the battery when it is determined that the actual voltage has risen to the full charge voltage of the battery in the m-th charging process.

\* \* \* \* \*